US012574188B2

(12) United States Patent
Wang et al.

(10) Patent No.: US 12,574,188 B2
(45) Date of Patent: Mar. 10, 2026

(54) SYSTEM AND METHOD FOR DISABLING HYBRID AUTOMATIC REPEAT REQUEST IN INTERNET OF THINGS-NON-TERRESTRIAL NETWORK

(71) Applicant: Mavenir US Inc., Richardson, TX (US)

(72) Inventors: Neng Wang, Lund (SE); Young-Han Nam, Plano, TX (US); Sina Khoshabi-Nobar, Ottawa (CA)

(73) Assignee: Mavenir US Inc, Richardson, TX (US)

( * ) Notice: Subject to any disclaimer, the term of this patent is extended or adjusted under 35 U.S.C. 154(b) by 334 days.

(21) Appl. No.: 18/308,200

(22) Filed: Apr. 27, 2023

(65) Prior Publication Data

US 2023/0361972 A1 Nov. 9, 2023

Related U.S. Application Data

(60) Provisional application No. 63/337,807, filed on May 3, 2022, provisional application No. 63/371,019, filed on Aug. 10, 2022.

(51) Int. Cl.
*H04L 5/00* (2006.01)
*H04L 1/1812* (2023.01)

(52) U.S. Cl.
CPC .......... *H04L 5/0055* (2013.01); *H04L 1/1812* (2013.01)

(58) Field of Classification Search
CPC ............................ H04L 5/0055; H04L 1/1812
See application file for complete search history.

(56) References Cited

U.S. PATENT DOCUMENTS

2022/0046677 A1* 2/2022 Talarico ................ H04W 72/23
2022/0201757 A1* 6/2022 Cruz ..................... H04L 1/1896

OTHER PUBLICATIONS

Lenovo et al."GPP TSG RAN WG1 Meeting#109- Disabling of HARQ Feedback for IoT NTN" 3rd Generation Partnership Project (3GPP) France, May 2022.
Spreadtrum Communications GPP TSG RAN WG1 Meeting#109-e "Considerations on Disabling of HARQ Feedback for IoT NTN", 3rd Generation Partnership Project (3GPP) France, May 2022.
Extended European search report for corresponding European patent application No. 23170990.8, 8 pages, dated Sep. 28, 2023.
3rd Generation Partnership Project (3GPP) Technical Specification (TS) 36.213 v.17.1.0"3rd Generation Partnership Project; Technical Specification Group Radio Access Network; Evolved Universal Terrestrial Radio Access (E-UTRA); Physical layer procedures (Release 17)" 3GPP, France, Mar. 2022.
3rd Generation Partnership Project (3GPP) Technical Specification (TS) 36.300 v 17.0"3rd Generation Partnership Project; Evolved Universal Terrestrial Radio Access (E-UTRA) and Evolved Universal Terrestrial Radio Access Network (E-UTRAN); Overall description; Stage 2; Release 17" 3GPP, France, Mar. 2022.

* cited by examiner

*Primary Examiner* — Erika A Washington
(74) *Attorney, Agent, or Firm* — Ruggiero McAllister & McMahon LLC

(57) ABSTRACT

Described are implementations for HARQ-disabling in IoT-NTN deployment AND disabling HARQ-ACK feedback. Signaling mechanisms include configurations for HARQ process ID(s), NPDCCH monitoring, a New Data Indicator (NDI) bit in Downlink Control Information (DCI), and a HARQ-ACK feedback transmission in the uplink.

16 Claims, 9 Drawing Sheets

SYSTEM AND METHOD FOR DISABLING HYBRID AUTOMATIC REPEAT REQUEST IN INTERNET OF THINGS-NON-TERRESTRIAL NETWORK

CROSS REFERENCE TO RELATED APPLICATIONS

This application claims priority to U.S. Provisional Patent Application No. 63/337,807 filed on May 3, 2022, and U.S. Provisional Patent Application No. 63/371,019 filed on Aug. 10, 2022, the entirety of each of which is incorporated herein by reference.

DESCRIPTION OF RELATED TECHNOLOGY a. Field of the Disclosure

The present disclosure relates to systems and methods for radio access networks. The present disclosure focuses on the design of operation, administration and management of various network elements of 4G and 5G based mobile networks.

b. Description of the Related Technology

In GEO satellite systems, due to long Round-Trip Delay (RTD), conventional systems are subject to HARQ stalling. In IoT-NTN networks there is a HARQ stalling problem because of the large RTD, especially for GEO satellite systems, and a smaller number of HARQ processes. HARQ stalling happens because before the HARQ-ACK feedback is received, the corresponding HARQ process cannot be used for scheduling. In terrestrial networks, a typical RTD including a processing delay is small (e.g.: 8 ms assumed in 3GPP Long Term Evolution (LTE) Frequency Division Duplex (FDD)), and a number of HARQ processes are designed to fill in the gap of RTD so that all resources can be scheduled by a base station. In NTN systems, the RTD can be 550 ms in GEO, even though the existing specification has been designed for terrestrial networks with a relatively small number of HARQ processes. This results in HARQ stalling issues, an example of which is illustrated in FIGS. 8A-8B.

FIGS. 8A-8B shows an example of a HARQ operation in IoT-NTN. When HARQ-disabling is not supported, a NPUSCH Format-2 is for HARQ-ACK feedback. Within duration of $T_{total}$, only one HARQ process can be scheduled. When $T_{total}$ is large, for example as is the case in GEO deployment, the system throughput can be significantly degraded.

Approaches to address HARQ operations include: (1) increasing a number of HARQ processes or (2) disabling a HARQ-ACK feedback. Approach (1) could address the HARQ stalling problem, but the number of HARQ processes could be large (e.g.: as in GEO), which increases complexity of both base station and UE, and hence may not be practical for services like IoT. With approach (2), enabling/disabling of HARQ-ACK feedback can be configured for each HARQ process ID. The HARQ process ID can reuse existing ID(s), or new set of ID(s). A bitmap can be signaled to indicate HARQ enabling/disabling per each and every configured HARQ process ID(s). Each bit in the bitmap indicates a configuration of UE behavior.

SUMMARY

Described are various embodiments of a system, method, and computer program product including program memory including instructions which, when executed by a processor, executes the method described above and herein.

In an implementation, described is a method comprising: configuring a base station to disable a Hybrid Automatic Repeat Request (HARQ) operation; configuring the base station to send a Narrow-Band Physical Downlink Control Channel (NPDCCH) transmission directly after a predetermined UE processing delay; and configuring a User Equipment (UE) to disable a HARQ-ACK feedback transmission. The UE can be configured to omit the HARQ-ACK feedback transmission in a Narrow-Band Physical Uplink Shared Channel (NPUSCH) format. The base station configured to reduce the predetermined UE processing delay to a reduced delay $k_1$. In an implementation, the predetermined UE processing delay can be 12 milliseconds, and the reduced delay k1 is less than 12 milliseconds (0 ms-11 ms).

In an implementation of the method, the base station can be configured to send an NDI bit configured to signal a User Equipment to enable or disable the HARQ-ACK feedback transmission; and the UE can be configured to enable or disable HARQ-ACK feedback transmission based on the NDI bit signal. The UE can include a value communicated by NDI bit and treats all transmissions from the base station as a new transmission. In an implementation, the UE can flush a decoding buffer after the reception of each NPDSCH from the base station.

In an implementation of the method, the UE can be configured to enable and transmit a HARQ-ACK when the NDI equals 1; and the UE can be configured to disable and not transmit a HARQ-ACK when the NDI equals 0.

In an implementation, the method can comprise: configuring the base station to perform a downlink (DL) budgeting operation based on the HARQ-ACK feedback transmission from the UE.

In an implementation, described is an apparatus configured to be implemented in a Narrowband Information of Things, comprising: a base station configured to disable a Hybrid Automatic Repeat Request (HARQ) operation and to send a Narrow-Band Physical Downlink Control Channel (NPDCCH) transmission immediately after a predetermined UE processing delay, wherein a User Equipment (UE) is configured to disable a HARQ-ACK feedback transmission signal. The base station can be configured reduce the predetermined UE processing delay to a reduced delay $k_1$. The predetermined UE processing delay can be configured to be 12 milliseconds, and the reduced delay $k_1$ can be configured to be less than 12 milliseconds (0 ms-11 ms). The base station can be configured to send an NDI bit configured to signal the UE to enable or disable the HARQ-ACK feedback transmission. The base station can be configured to perform a downlink (DL) budgeting operation based on a HARQ-ACK feedback transmission from the UE.

In an implementation of the apparatus, a User Equipment (UE) is configured to be implemented in a Narrowband Information of Things, comprising: the UE being configured to disable a Hybrid Automatic Repeat Request (HARQ) feedback transmission signal in response to a base station configured to disable a HARQ operation and send a Narrow-Band Physical Downlink Control Channel (NPDCCH) transmission immediately after a predetermined UE processing delay. The UE can be configured to omit the HARQ-ACK feedback transmission in a Narrow-Band Physical Uplink Shared Channel (NPUSCH) format.

In an implementation of the apparatus, the UE can be configured to receive an NDI bit configured to enable or disable the HARQ-ACK feedback transmission from the base station and to enable or disable the HARQ-ACK feedback transmission based on the NDI bit signal. The UE can be configured to ignore a value communicated by NDI bit and treats all transmissions from the base station as a new transmission. The UE can be configured to flush a decoding buffer after the reception of each NPDSCH from the base station. In an implementation, the UE can be configured to enable and transmit a HARQ-ACK when the NDI equals 1; and the UE can be configured to disable and not transmit a HARQ-ACK when the NDI equals 0.

In an implementation, described is a system comprising: a base station configured to disable a Hybrid Automatic Repeat Request (HARQ) operation; the base station being configured to send a Narrow-Band Physical Downlink Control Channel (NPDCCH) transmission immediately after a predetermined UE processing delay; and a User Equipment (UE) configured to disable a HARQ-ACK feedback transmission. The UE can be configured to omit the HARQ-ACK feedback transmission in a Narrow-Band Physical Uplink Shared Channel (NPUSCH) format. The base station can be configured to reduce the predetermined UE processing delay to a reduced delay $k_1$. In an implementation, the predetermined UE processing delay can be 12 milliseconds, and the reduced delay k1 is less than 12 milliseconds (0 ms-11 ms).

In an implementation, the system can comprise the base station being configured to send an NDI bit configured to signal a UE to enable or disable the HARQ-ACK feedback transmission; and the UE being configured to enable or disable HARQ-ACK feedback transmission based on the NDI bit signal. The UE can be configured to ignore a value communicated by NDI bit and treat all transmissions from the base station as a new transmission. In an implementation, the UE can be configured to flush a decoding buffer after the reception of each NPDSCH from the base station.

In an implementation, the system can comprise the UE being configured to enable and transmit a HARQ-ACK when the NDI equals 1; and the UE can be configured to disable and not transmit a HARQ-ACK when the NDI equals 0.

In an implementation, the system can comprise: the base station being configured to perform a downlink (DL) budgeting operation based the HARQ-ACK feedback transmission from the UE.

DETAILED DESCRIPTION

Figure 1:
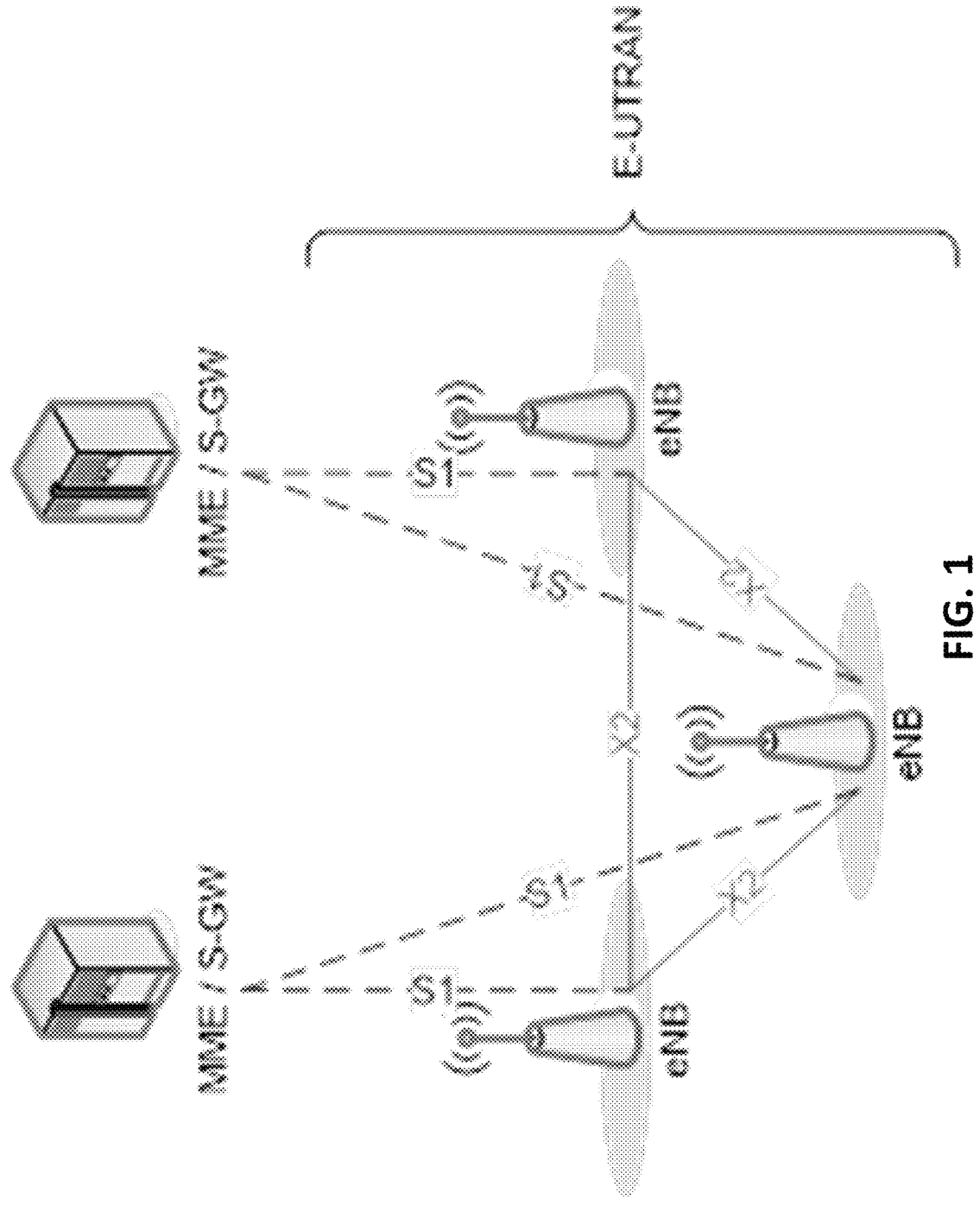
FIG. 1 illustrates an E-UTRAN network architecture.

The present disclosure describes implementations for various wireless communication networks such as CDMA, TDMA, FDMA, OFDMA, SC-FDMA and other networks. A CDMA network can implement a radio technology such as universal terrestrial radio access (UTRA), cdma2000, etc. UTRA includes wideband CDMA (WCDMA), time division synchronous CDMA (TD-SCDMA), and other variants of CDMA. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). UTRA, E-UTRA, UMTS, LTE, LTE-A and GSM are described in documents from an organization named "3rd Generation Partnership Project" (3GPP). NR (e.g., 5G radio access) includes an evolving set of enhancements to the 3GPP 3G LTE mobile standard. Implementations as described herein can be employed for radio technologies and wireless networks as described above and herein as well as other wireless networks and radio technologies.

Reference is made to Third Generation Partnership Project (3GPP) and the Internet Engineering Task Force (IETF) in accordance with embodiments of the present disclosure. The present disclosure employs abbreviations, terms and technology defined in accord with Third Generation Partnership Project (3GPP) and/or Internet Engineering Task Force (IETF) technology standards and papers, including the following standards and definitions. 3GPP and IETF technical specifications (TS), standards (including proposed standards), technical reports (TR) and other papers are incorporated by reference in their entirety hereby, define the related terms and architecture reference models that follow.

3GPP TS 36.213 v 17.1.0 (March 2022)

3GPP TS 36.300 V17.0.0 (March 2022)

Abbreviations

CU Control Unit

DU Distributed Unit

BCH Broadcast Channel

DL-SCH Downlink Shared Channel

UL-SCH Uplink Shared Channel

E-UTRAN Evolved UTRAN

EN-DC E-UTRA-NR Dual Connectivity eNB E-UTRAN NodeB

EPC Evolved Packet Core

IoT Internet of Things

NB-IoT Narrow-Band IoT

NTN Non-Terrestrial Network

GEO Geosynchronous Equatorial Orbit

DCI Downlink Control Information

NDI New Data Indicator

NR NR Radio Access

MN Master Node

HARQ Hybrid Automatic Repeat Request

PDCP Packet Data Convergence Protocol

PCH Physical Channel

ACK Acknowledgement

RRC Remote Radio Control

RTD Round-Trip Delay

RTT Round-TripTime

SDAP Service Data Adaptation Protocol

SN Secondary Node

NPDCCH Narrow-Band Physical Downlink Control Channel

NPUSCH Narrow-Band Physical Uplink Shared Channel

NPDSCH Narrow-Band Physical Downlink Shared Channel

Definitions

Dual Connectivity: a mode of operation of a UE in RRC_CONNECTED, configured with a Master Cell Group and a Secondary Cell Group.

En-gNB: a node providing NR user plane and control plane protocol terminations towards the UE, and acting as Secondary Node in EN-DC.

gNB: a node providing NR user plane and control plane protocol terminations towards the UE, and connected via the NG interface to the 5GC.

gNB Central Unit (gNB-CU): a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU.

gNB Distributed Unit (gNB-DU): a logical node hosting RLC, MAC and PHY layers of the gNB or en-gNB, and its operation is partly controlled by gNB-CU. One gNB-DU supports one or multiple cells. One cell is supported by only one gNB-DU. The gNB-DU terminates the F1 interface connected with the gNB-CU.

gNB-CU-Control Plane (gNB-CU-CP): a logical node hosting the RRC and the control plane part of the PDCP protocol of the gNB-CU for an en-gNB or a gNB. The gNB-CU-CP terminates the E1 interface connected with the gNB-CU-UP and the F1-C interface connected with the gNB-DU.

gNB-CU-User Plane (gNB-CU-UP): a logical node hosting the user plane part of the PDCP protocol of the gNB-CU for an en-gNB, and the user plane part of the PDCP protocol and the SDAP protocol of the gNB-CU for a gNB. The gNB-CU-UP terminates the E1 interface connected with the gNB-CU-CP and the F1-U interface connected with the gNB-DU.

Narrowband Physical Broadcast Channel (NPBCH)
  The coded BCH transport block is mapped to sixty four subframes within a 640 ms interval;
  640 ms timing is blindly detected, i.e. there is no explicit signaling indicating 640 ms timing.

Narrowband Physical Downlink Shared Channel (NPDSCH)
  Carries the DL-SCH and PCH for NB-IoT UEs.

Narrowband Physical Downlink Control Channel (NPDCCH)
  Informs the NB-IoT UE about the resource allocation of PCH and DL-SCH;
  Carries the uplink scheduling grant for the NB-IoT UE;
  Carries the direct indication information.

Narrowband Physical Uplink Shared Channel (NPUSCH)
  Carries the UL-SCH and Hybrid ARQ ACK/NAKs in response to downlink transmission for the NB-IoT UE;
  Carries SR for the NB-IoT UE.

Narrowband Physical Random Access Channel (NPRACH)
  Carries the random access preamble for the NB-IoT UE;
  Carries SR for the NB-IoT UE.

An E-UTRAN architecture is illustrated in FIG. 1. The E-UTRAN comprises of eNBs, providing the E-UTRA user plane (PDCP/RLC/MAC/PHY) and control plane (RRC) protocol terminations towards the UE. The eNBs are interconnected with each other by means of the X2 interface. The eNBs are also connected by means of the S1 interface to the EPC (Evolved Packet Core), more specifically to the MME (Mobility Management Entity) by means of the S1-MME interface and to the Serving Gateway (S-GW) by means of the S1-U interface. The S1 interface supports a many-to-many relation between MMEs/Serving Gateways and eNBs.

Figure 2:
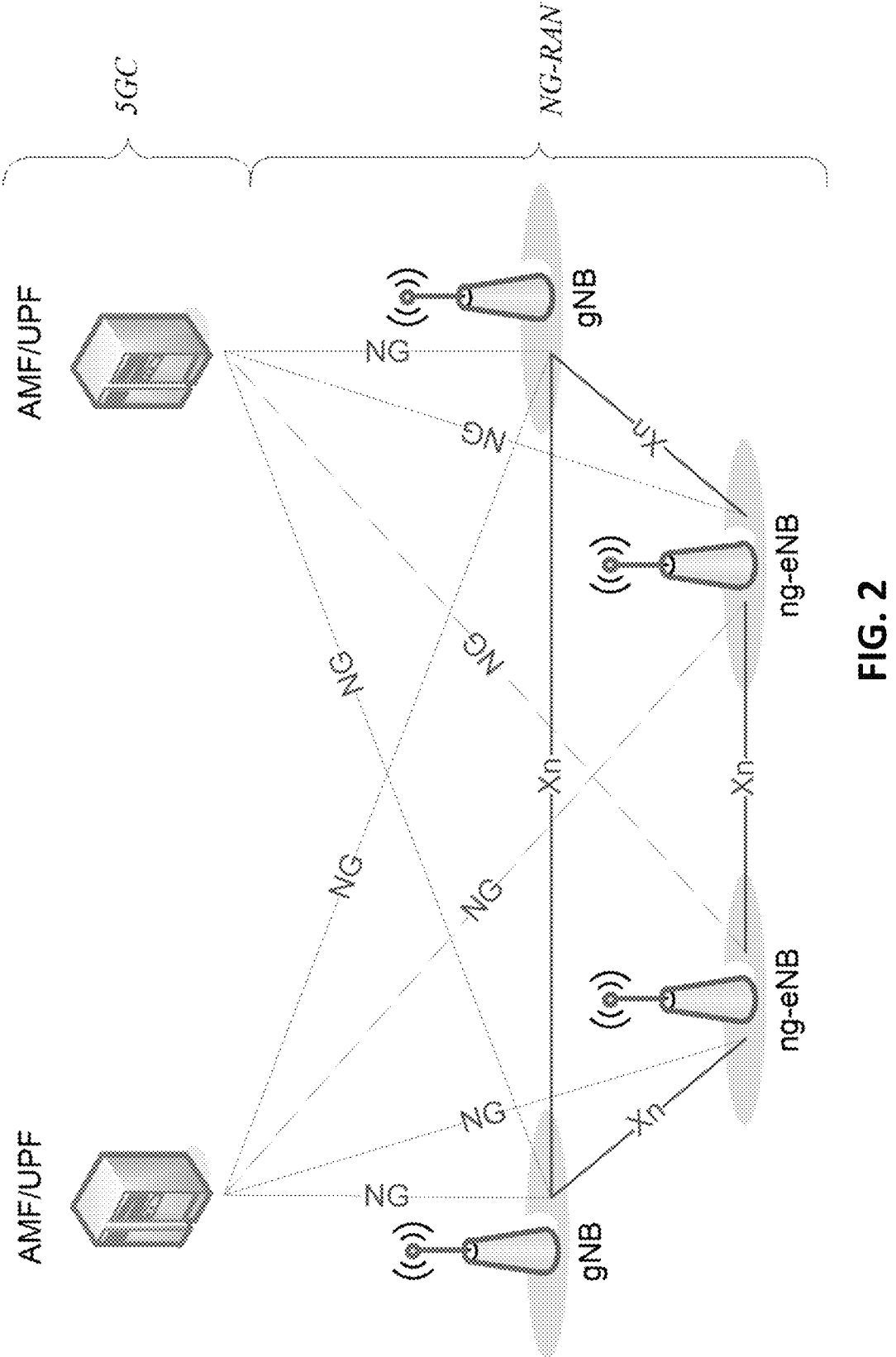
FIG. 2. Illustrates an E-UTRA-NR Dual Connectivity network architecture.

E-UTRAN also supports MR-DC via E-UTRA-NR Dual Connectivity (EN-DC), in which a UE is connected to one eNB that acts as a MN and one en-gNB that acts as a SN. An EN-DC architecture is illustrated in FIG. 2. The eNB is connected to the EPC via the S1 interface and to the en-gNB via the X2 interface. The en-gNB might also be connected to the EPC via the S1-U interface and other en-gNBs via the X2-U interface. Inin EN-DC, and en-gNB comprises gNB-CU and gNB-DU(s).

Figure 3:
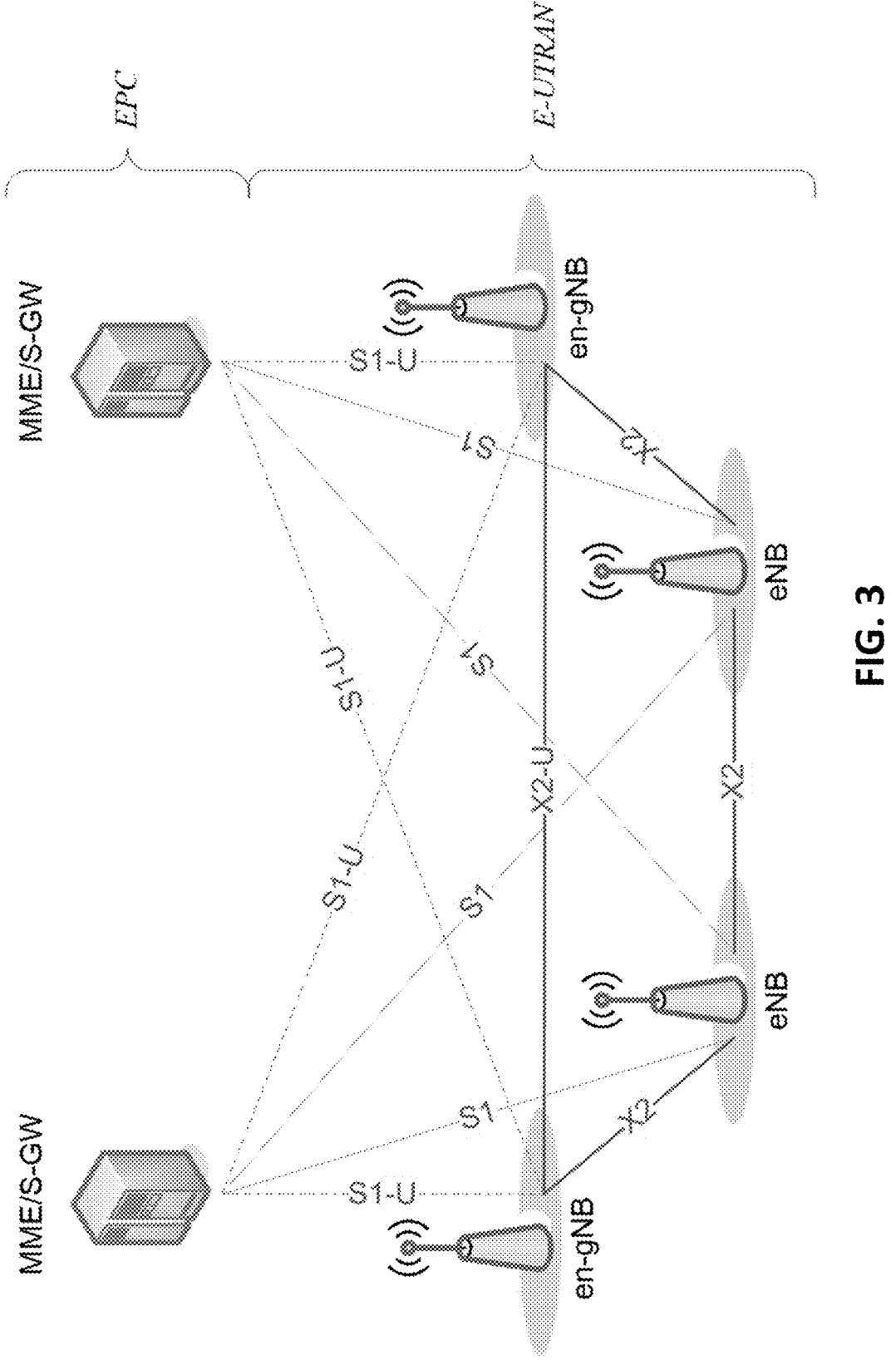
FIG. 3 illustrates an NG-RAN architecture.

E-UTRAN also supports and NG-RAN architecture. An NG-RAN architecture is illustrated in FIG. 3. An NG-RAN node is either:
  a gNB, providing NR user plane and control plane protocol terminations towards the UE; or
  an ng-eNB, providing E-UTRA user plane and control plane protocol terminations towards the UE. (3GPP TS 38.300 V17.0.0.)

As shown in FIGS. 1-3, the gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface. The gNB and ng-eNB host functions for Radio Resource Management such as: Radio Bearer Control, Radio Admission Control, Connection Mobility Control, Dynamic allocation of resources to UEs in both uplink and downlink (scheduling), connection setup and release; session Management; QoS Flow management and mapping to data radio bearers; Dual Connectivity. Tight interworking between NR and E-UTRA. NB-IoT UE is supported by ng-eNB.

Figure 4:
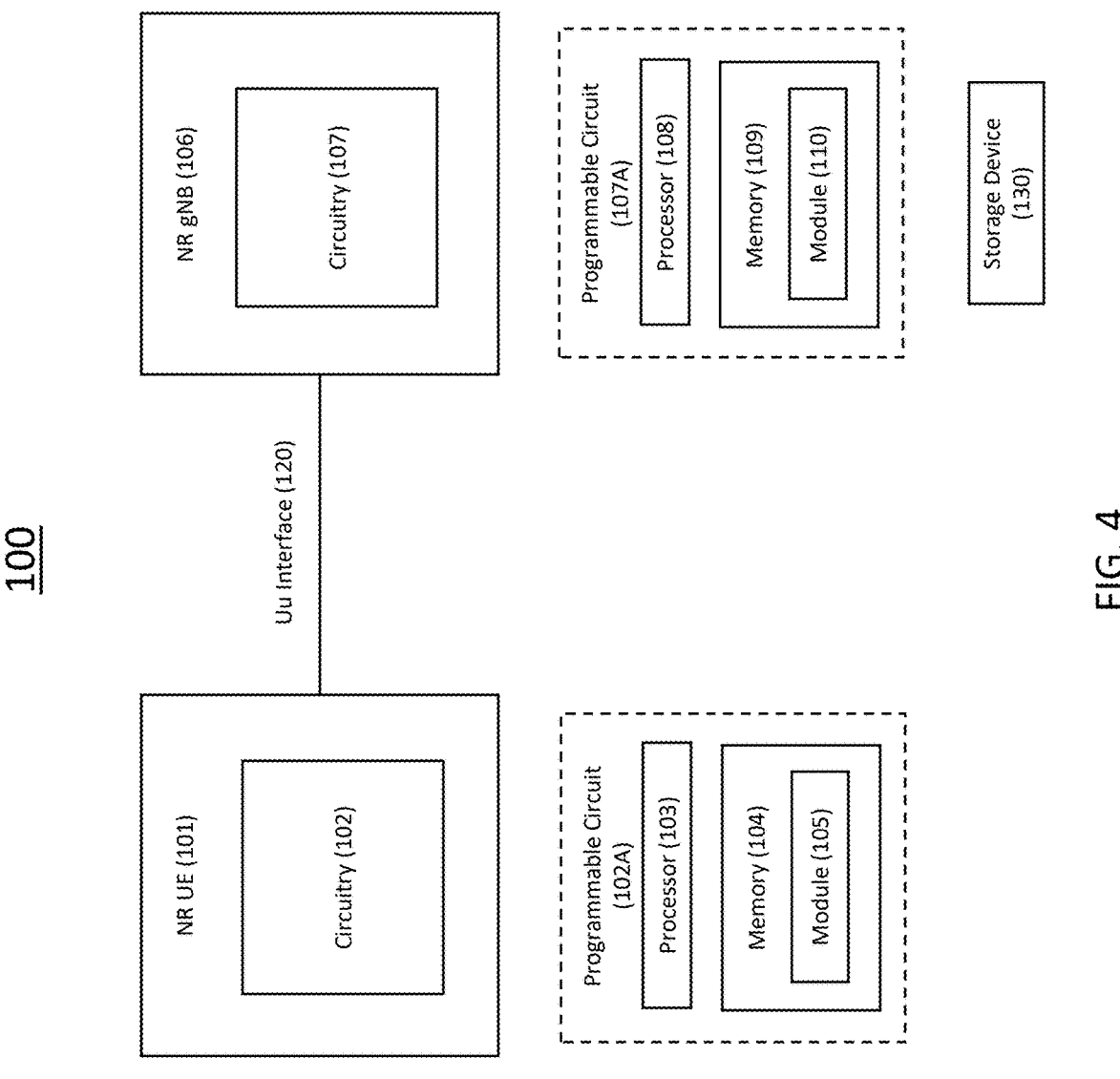
FIG. 4 is a block diagram of an NR system.

FIG. 4 is a block diagram of a system 100. System 100 includes a NR UE 101, a NR gNB 106. The NR UE and NR gNB are communicatively coupled via a Uu interface 120.

NR UE 101 includes electronic circuitry, namely circuitry 102, that performs operations on behalf of NR UE 101 to execute methods described herein. Circuity 102 may be implemented with any or all of (a) discrete electronic components, (b) firmware, and (c) a programmable circuit 102A.

NR gNB 106 includes electronic circuitry, namely circuitry 107, that performs operations on behalf of NR gNB 106 to execute methods described herein. Circuity 107 may be implemented with any or all of (a) discrete electronic components, (b) firmware, and (c) a programmable circuit 107A.

Programmable circuit 107A, which is an implementation of circuitry 107, includes a processor 108 and a memory 109. Processor 108 is an electronic device configured of logic circuitry that responds to and executes instructions. Memory 109 is a tangible, non-transitory, computer-readable storage device encoded with a computer program. In this regard, memory 109 stores data and instructions, i.e., program code, that are readable and executable by processor 108 for controlling operations of processor 108. Memory 109 may be implemented in a random-access memory (RAM), a hard drive, a read only memory (ROM), or a combination thereof. One of the components of memory 109 is a program module, namely module 110. Module 110 contains instructions for controlling processor 108 to execute operations described herein on behalf of NR gNB 106.

The term "module" is used herein to denote a functional operation that may be embodied either as a stand-alone component or as an integrated configuration of a plurality of subordinate components. Thus, each of module 105 and 110 may be implemented as a single module or as a plurality of modules that operate in cooperation with one another.

While modules 110 are indicated as being already loaded into memories 109, and module 110 may be configured on a storage device 130 for subsequent loading into their memories 109. Storage device 130 is a tangible, non-transitory, computer-readable storage device that stores module 110 thereon. Examples of storage device 130 include (a) a compact disk, (b) a magnetic tape, (c) a read only memory, (d) an optical storage medium, (e) a hard drive, (f) a memory unit consisting of multiple parallel hard drives, (g) a universal serial bus (USB) flash drive, (h) a random-access memory, and (i) an electronic storage device coupled to NR gNB 106 via a data communications network.

Uu Interface (120) is the radio link between the NR UE and NR gNB, which is compliant to the 5G NR specification.

UEs 101 can be dispersed throughout wireless communication network, and each UE may be stationary or mobile. A UE includes: an access terminal, a terminal, a mobile station, a subscriber unit, a station, etc. A UE can also include be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a drone, a robot/robotic device, a netbook, a smartbook, an ultrabook, a medical device, medical equipment, a healthcare device, a biometric sensor/device, a wearable device such as a smart watch, smart clothing, smart glasses, a smart wristband, and/or smart jewelry (e.g., a smart ring, a smart bracelet, etc.), an entertainment device (e.g., a music device, a video device, a satellite radio, etc.), industrial manufacturing equipment, a global positioning system (GPS) device, or any other suitable device configured to communicate via a wireless or wired medium. UEs can include UEs considered as machine-type communication (MTC) UEs or enhanced/evolved MTC (eMTC) UEs. MTC/eMTC UEs that can be implemented as IoT UEs. IoT UEs include, for example, robots/robotic devices, drones, remote devices, sensors, meters, monitors, cameras, location tags, etc., that can communicate with a BS, another device (e.g., remote device), or some other entity. A wireless node can provide, for example, connectivity for or to a network (e.g., a wide area network such as Internet or a cellular network) via a wired or wireless communication link.

One or more UEs 101 in the wireless communication network (e.g., an LTE network) can be a narrowband bandwidth UE. As used herein, devices with limited communication resources, e.g. smaller bandwidth, are considered as narrowband UEs. Similarly, legacy devices, such as legacy and/or advanced UEs (e.g., in LTE) can be considered as wideband UEs. Wideband UEs are generally understood as devices that use greater amounts of bandwidth than narrowband UEs.

In some implementations, access to a wireless interface may be scheduled, wherein a scheduling entity (e.g.: BS) allocates bandwidth resources for devices and equipment within its service area or cell. As scheduling entity can be configured to schedule, assign, reconfigure, and release resources for one or more subordinate entities. BSs are not the only entities that may function as a scheduling entity. In some examples, a UE 106 (or other device) may function as master node scheduling entity, scheduling resources for one or more secondary node subordinate entities (e.g., one or more other UEs 120). Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, the gNB and ng-eNB host functions such as functions for Radio Resource Management: Radio Bearer Control, Radio Admission Control, Connection Mobility Control, Dynamic allocation of resources to UEs in both uplink and downlink (scheduling), connection setup and release; session Management; QoS Flow management and mapping to data radio bearers; Dual Connectivity; Tight interworking between NR and E-UTRA. NB-IoT UE is supported by ng-eNB.

In an example, control information (e.g., scheduling information) may be provided for broadcast and/or multicast operation. The UE may monitor different bundle sizes for the control channel depending on the maximum number of repetitions.

In an NB-IOT network architecture, a narrow downlink physical control channel (NPDCCH) can be used to schedule DL transmissions to a UE. For NB-IoT downlink scheduling, as explained in 3GPP TS 36.300 V17.0.0 (March 2022):

Scheduling information for downlink data is transmitted on the downlink physical control channel NPDCCH. The scheduled downlink data is transmitted on the shared data channel NPDSCH;

Only cross-subframe scheduling is supported, cross-carrier scheduling is not supported. The transmission duration in number of sub-frames for the NPDCCH and the NPDSCH is variable;

The transmission duration in number of sub-frames is semi-static for the NPDCCH and is indicated for the NPDSCH as part of the scheduling information transmitted on the NPDCCH;

The start time of the NPDSCH relative to the NPDCCH is signalled as part of the scheduling message;

HARQ Asynchronous Incremental Redundancy Hybrid ARQ is supported. Conventionally, when multi-TB scheduling is configured, a single NPDCCH can indicate scheduling of multiple downlink transmissions, where each transmission corresponds to one HARQ process.

In the NB-IoT uplink, conventionally, when multi-TB scheduling is configured, a single NPDCCH can indicate scheduling of multiple uplink transmissions, where each transmission corresponds to one HARQ process.

Described are implementations for HARQ-disabling in IoT-NTN deployment. The present disclosure describes implementations for disabling HARQ-ACK feedback. In implementations, described are signaling mechanisms including configurations for HARQ process ID(s), NPDCCH monitoring, a New Data Indicator (NDI) bit in Downlink Control Information (DCI), and HARQ-ACK feedback transmission in the uplink.

NPDCCH Monitoring

The specification of 3GPP TS 36.213 v 17.1.0 as of the present disclosure at Section 16.6 has the following restriction for an NB-IoT UE to monitor NPDCCH:

If a NB-IoT UE detects NPDCCH with DCI Format N1 ending in subframe n, and if the corresponding NPDSCH transmission starts from n+k, and for FDD, if the corresponding NPUSCH format 2 transmission starts from subframe n+m (accounting for uplink transmission timing), the UE is not required to monitor NPDCCH in any subframe starting from subframe n+k to subframe n+m−1.

For TDD, if the corresponding NPUSCH format 2 transmission ends in subframe n+m the UE is not required to monitor NPDCCH in any subframe starting from subframe n+k to subframe n+m−1.

Figure 8A:
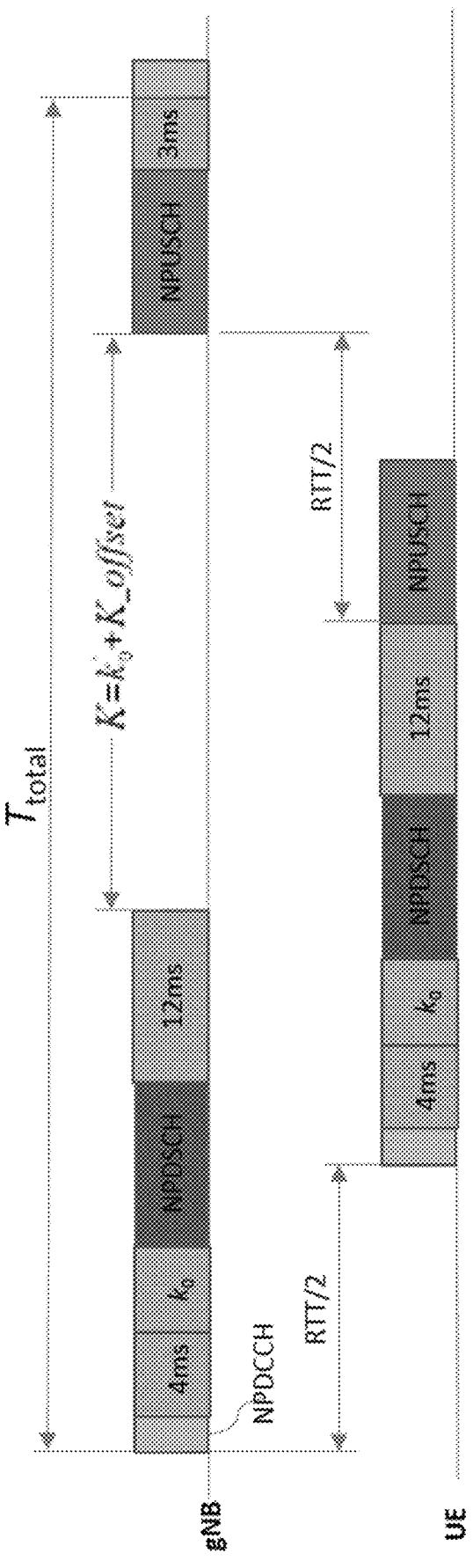
FIGS. 8A-8B show an example of a HARQ operation.
Figure 8B:
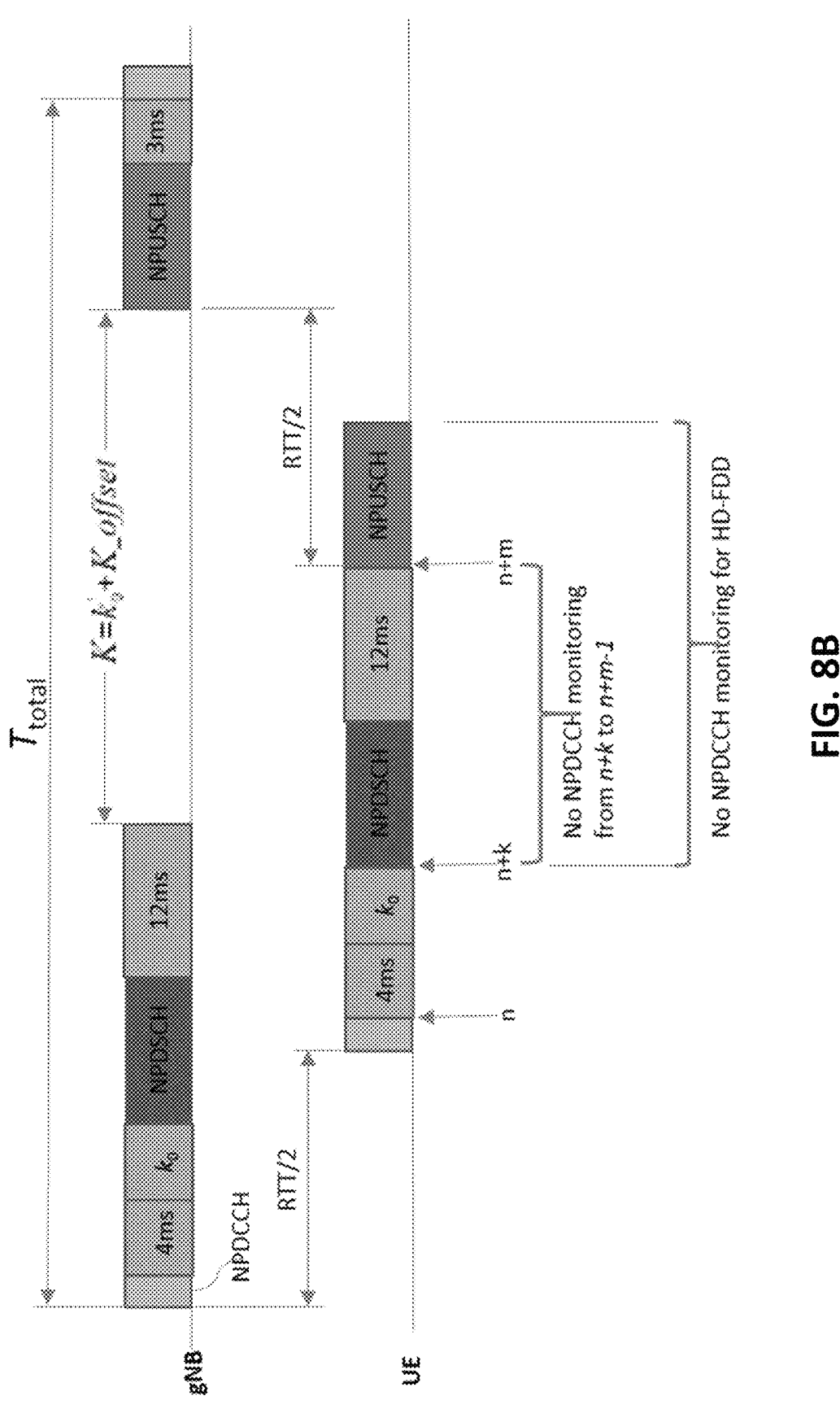

As noted above, the timing restriction for NPD NPDCCH monitoring and HARQ-ACK feedback timing is illustrated in the example shown FIG. 8B. For Half-Duplex (HD) UE's, the NPDCCH cannot be monitored for any longer until a NPUSCH transmission is completed. This NPDCCH monitoring timing restriction reduces scheduling opportunities and degrades system throughput.

Accordingly, disclosed are implementations that introduce a higher layer signal for HARQ-disabling operations.

Figure 5:
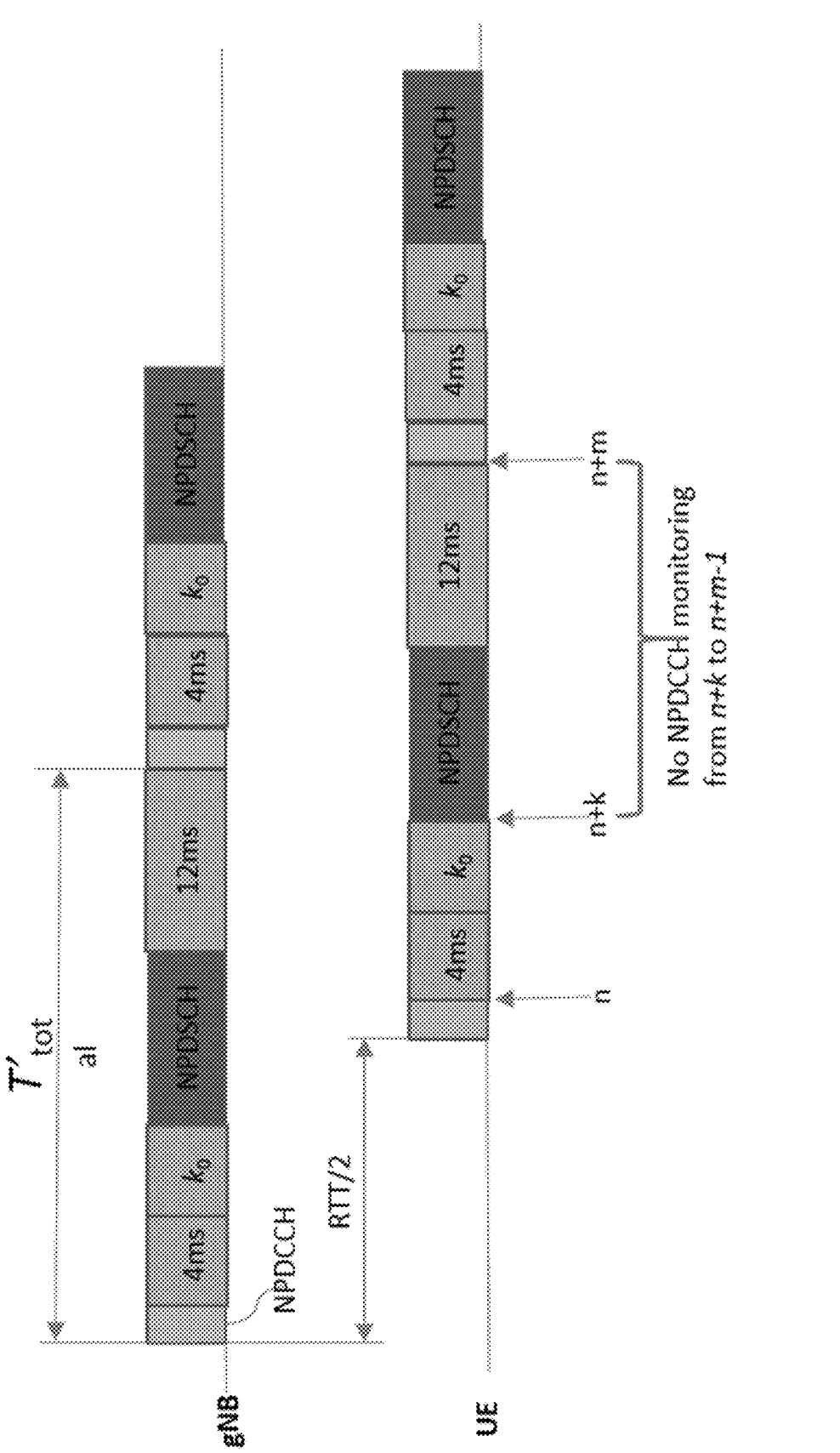
FIG. 5 shows an illustration of an NPDCCH/NPDSCH sequence with HARQ-ACK disabled.

FIG. 5 shows an illustration of an NPDCCH/NPDSCH sequence with HARQ-ACK disabled. Since HARQ-ACK feedback is turned off, NPDCCH transmission can start right after UE processing delay, given as 12 msec, as shown in FIG. 5. With reduction of total duration for scheduling a HARQ process, $T'_{total}$, the system throughput is increased accordingly.

Figure 6:
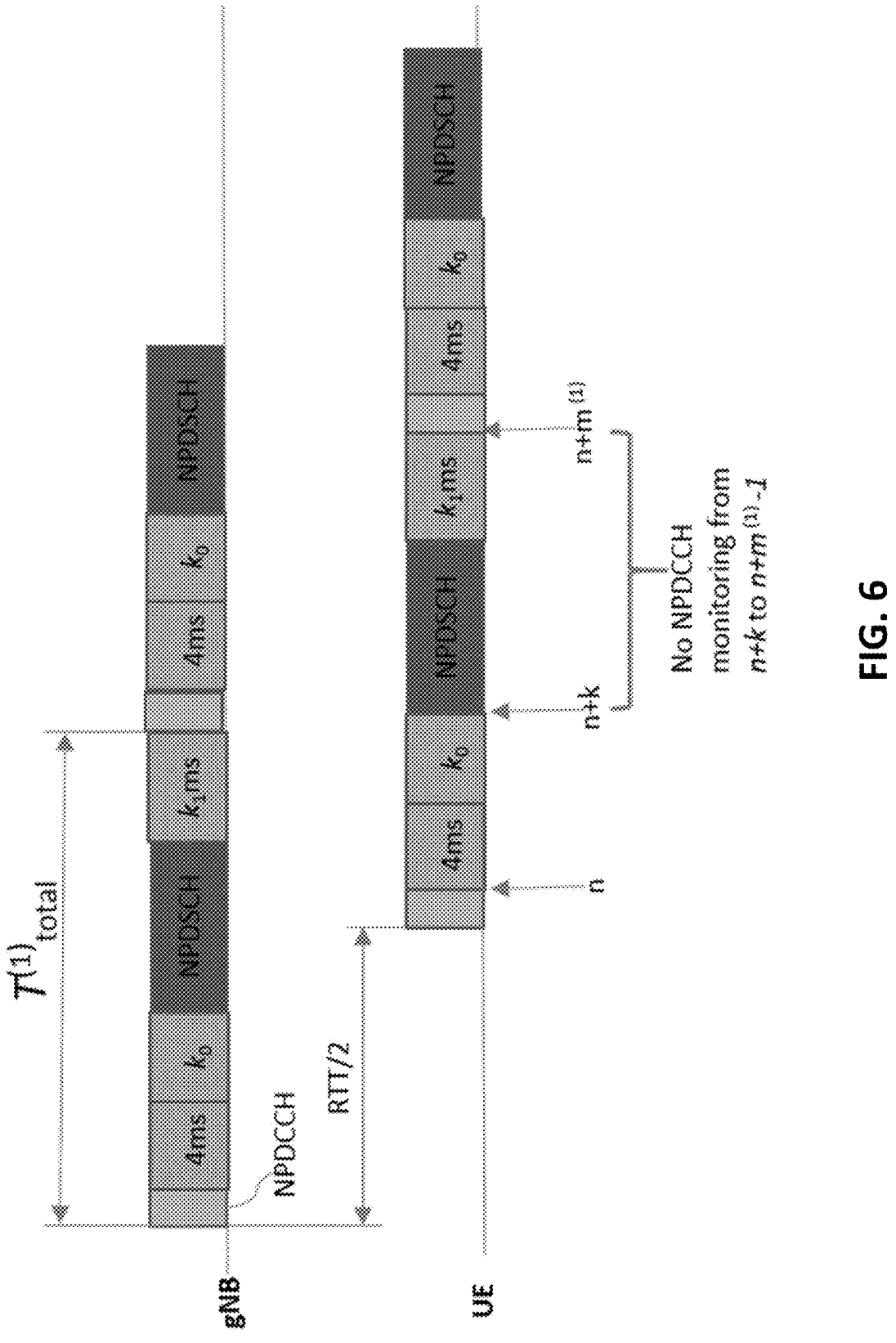
FIG. 6 shows an example of an implementation of a NPDCCH operation.

FIG. 6 shows an example of an implementation of a NPDCCH "fast monitoring" operation. Since there is no HARQ-ACK feedback in the HARQ-disabling operation, UE processing time which (e.g., 12 msec in existing specification) can be reduced to further boost system throughput. For example, as shown in FIG. 6, the system is configured to implement a $k_1$<12 msec gap is to facilitate UE decoding. In an implementation, the $k_1$ interval can be 0, for example, where a UE runs pipelining DL reception and decoding. This can further reduce NPDCCH monitoring timing restriction duration, and boost system throughput, as illustrated in the FIG. 6. As such, a $k_1$<12 msec can be 0 msec to 11 msec.

Figure 7:
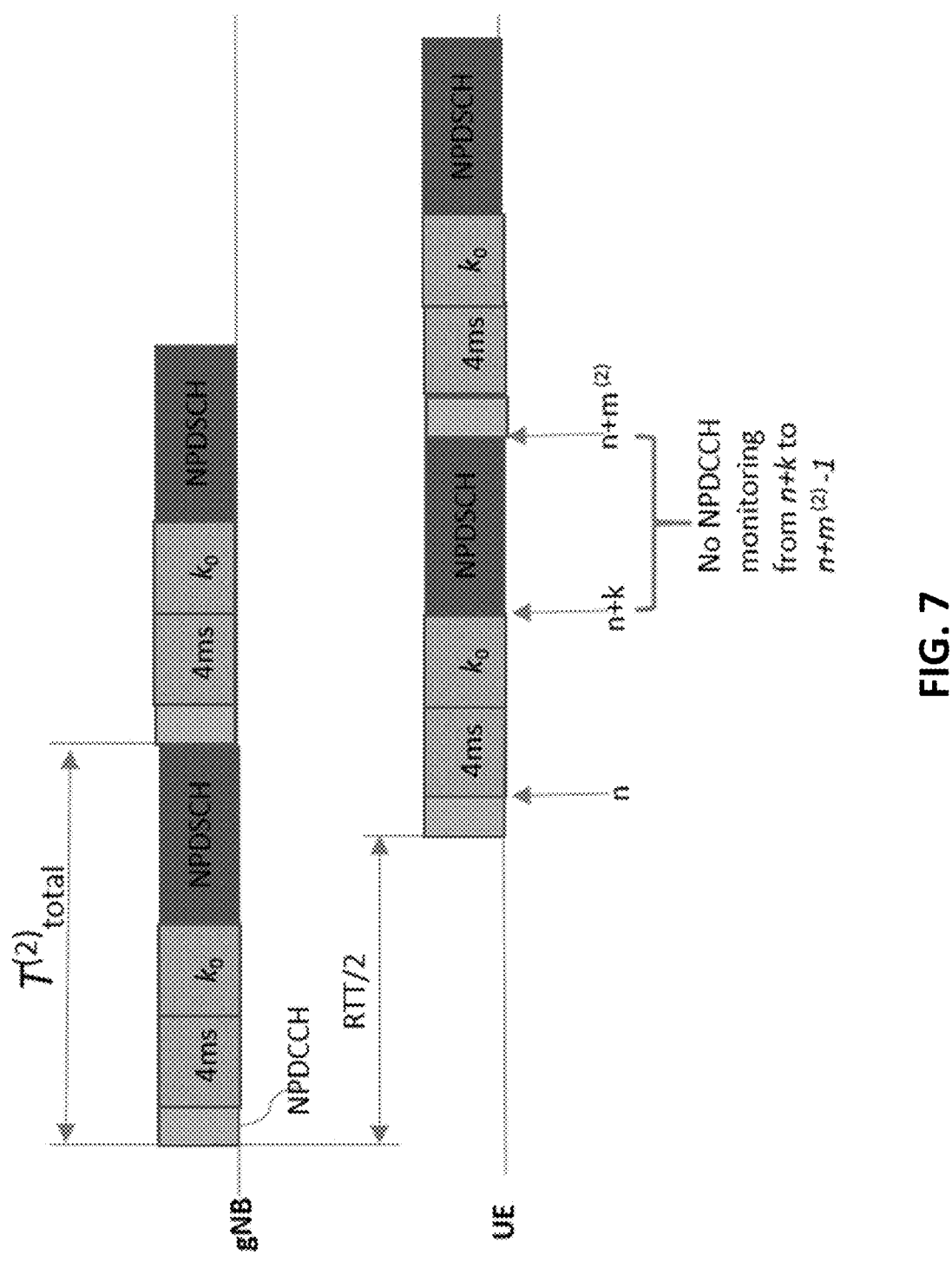
FIG. 7 shows an example of an implementation of a NPDCCH operation.

FIG. 7 shows another example of NPDCCH fast monitoring.

HARQ-ACK Feedback.

In conventional operation with HARQ, when UE receives a downlink transport block, after decoding, it will feedback HARQ-ACK in NPUSCH Format-2. However, with HARQ disabled, HARQ-ACK feedback can be turned off.

NDI Bit in DCI

DCI is used to carry scheduling information for downlink and uplink transmission. As an example, DCI for UL grant in NB-IoT is given in Table 1 below.

TABLE 1

| Field | # of Bits |
|---|---|
| Flag for format N0/format N1 differentiation | 1 |
| Subcarrier indication | 6 |
| Resource assignment | 3 |
| Scheduling delay | 2 |
| Modulation and coding scheme | 4 |
| Redundancy version | 1 |
| Repetition number | 3 |
| New data indicator | 1 |
| DCI subframe repetition number | 2 |
| Total Number of Bits | 23 |

In conventional systems without HARQ-disabling, there is 1-bit of NDI to indicate if the transmission is new data or a retransmission. With HARQ-disabling, the system is configured so the base station does not perform retransmission due to disabled HARQ. The system thereby interprets each transmission as a new transmission, and the NDI bit does not carry information. In this disclosure, in an implementation, the system can be configured to interpret an NDI bit as an indicator to UE to send HARQ-ACK feedback.

Aspects and Advantages

In implementations, the system can be configured for appropriate operation as described herein. Exemplary configurations are as follows:

(1) Configuration of UE behavior related to HARQ enabling/disabling. In an implementation, UE behavior includes NPDCCH monitoring behavior (fast vs. legacy), HARQ-ACK feedback transmission (on or off), and interpreting NDI bit, as in 2), 3) and 4) below. These various UE behaviors can be either independently or jointly configured.

(2) UE behavior of NPDCCH monitoring is configured as one of the following, via network signaling. (A) UE follows the legacy NPDCCH monitoring timing; and (B) UE follows a faster NPDCCH monitoring timing as described above with respect to FIG. 6 or FIG. 7.

(3) UE behavior of HARQ-ACK feedback transmission is configured as one of the following, via network signaling. (A) Upon reception of NPDSCH, UE is configured to transmit HARQ-ACK feedback in NPUSCH Format-2 following timing as described with respect to FIGS. 8A-8B. (B) Upon reception of NPDSCH, UE is configured to omit/skip a HARQ-ACK feedback in NPUSCH Format-2 as described with respect to FIGS. 8A-8B.

(4) UE behavior of interpreting NDI bit is configured as one of the following, via network signaling. (A) If NDI bit is toggled, UE assumes that the corresponding NPDSCH is a new HARQ transmission; otherwise, UE assumes the corresponding NPDSCH is HARQ retransmission (same as legacy behavior). (B) The system is configured to reinterpret the NDI bit to indicate HARQ-ACK feedback transmission as in (3) above.

Further Description of Implementations

In an implementation, a higher layer signaling disables HARQ-ACK feedback from UE side. Network and UE behaviors are as follows:

UE omits/skips HARQ-ACK transmission. gNB does not expect HARQ-ACK feedback for NPDSCH. gNB may start transmission of the next NPDCCH right after 12 msec processing time of UE for previous NPDSCH.

UE ignores the value communicated by NDI bit. UE treats all transmissions as new transmission and flushes decoding buffer after the reception of each NPDSCH.

UE's NPDCCH monitoring behavior is same as legacy system (monitoring starts 12 msec after NPDSCH).

In another implementation, a higher layer signaling disables HARQ-ACK feedback from UE side and enables NPDCCH fast monitoring. Network and UE behaviors are as follows:

UE starts NPDCCH monitoring after $k_1$<12 msec (or 0 msec, if UE has DL pipelining capability) after NPDSCH. UE's behavior implemented as described with respect to either FIG. 3 or FIG. 4 as described above.

UE omits/skips HARQ-ACK transmission. The gNB can start transmission of the next NPDCCH $k_1$ msec for option 1, or 0 msec for option 2, after the previous NPDSCH. UE ignores the value communicated by NDI bit. UE treats all transmissions as new transmission and flushes decoding buffer after the reception of each NPDSCH.

In another implementation, a higher layer signaling disables HARQ-ACK feedback from UE side. Network and UE behavior are as follows:

UE's NPDCCH monitoring behavior is same a conventional system (e.g., monitoring starts 12 msec after NPDSCH).

UE is configured to send HARQ-ACK as determined by NDI bit as explained below. gNB can expect HARQ-ACK feedback for NPDSCH according to NDI bit in DCI. The gNB uses the HARQ-ACK for DL link budgeting purpose. gNB can start transmission of the next NPDCCH right after 12 msec processing time of UE for previous NPDSCH.

UE is configured to interpret the NDI bit as a dynamic signaling of HARQ transmission disabling/enabling. When NDI=0, UE skips HARQ-ACK transmission. When NDI=1, UE transmits HARQ-ACK. UE treats all transmissions as new transmission and flushes decoding buffer after the reception of each NPDSCH.

It will be understood that implementations and embodiments can be implemented by computer program instructions. These program instructions can be provided to a processor to produce a machine, such that the instructions, which execute on the processor, create means for implementing the actions specified herein. The computer program instructions can be executed by a processor to cause a series of operational steps to be performed by the processor to produce a computer-implemented process such that the instructions, which execute on the processor to provide steps for implementing the actions specified. Moreover, some of the steps can also be performed across more than one processor, such as might arise in a multi-processor computer system or even a group of multiple computer systems. In addition, one or more blocks or combinations of blocks in the flowchart illustration can also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. The foregoing examples should not be construed as limiting and/or exhaustive, but rather, an illustrative use case to show an implementation of at least one of the various embodiments.

The invention claimed is:

1. A method comprising:
configuring a base station to disable a Hybrid Automatic Repeat Request (HARQ) operation;
configuring the base station to send a Narrow-Band Physical Downlink Control Channel (NPDCCH) transmission immediately after a predetermined User Equipment (UE) processing delay;
configuring a UE to disable a HARQ-Acknowledgement (HARQ-ACK) feedback transmission; and
configuring the UE to flush a decoding buffer after a reception of each Narrow-Band Physical Downlink Shared Channel (NPDSCH) from the base station.

2. The method of claim 1, comprising:
configuring the UE to omit the HARQ-ACK feedback transmission in a Narrow-Band Physical Uplink Shared Channel (NPUSCH) format.

3. The method of claim 1, comprising
configuring the base station to reduce the predetermined UE processing delay to a reduced delay $k_1$.

4. The method of claim 3, wherein the predetermined UE processing delay is 12 milliseconds, and the reduced delay $k_1$ is less than 12 milliseconds (0 ms-11 ms).

5. The method of claim 1, further comprising:
configuring the base station to send a New Data Indicator (NDI) bit configured to signal the UE to selectively enable or disable the HARQ-ACK feedback transmission;
configuring the UE to selectively enable or disable the HARQ-ACK feedback transmission based on the NDI bit signal.

6. The method of claim 5, further comprising:
the UE ignoring a value communicated by the NDI bit and treating all transmissions from the base station as a new transmission.

7. The method of claim 5, further comprising;
configuring the UE to enable and transmit the HARQ-ACK when the NDI equals 1; and
configuring the UE to disable and not transmit the HARQ-ACK when the NDI equals 0.

8. The method of claim 1, further comprising;
configuring the base station to perform a downlink (DL) budgeting operation based on the HARQ-ACK feedback transmission from the UE.

9. An apparatus configured to be implemented in a Narrowband Information of Things, comprising:
a base station configured to disable a Hybrid Automatic Repeat Request (HARQ) operation and to send a Narrow-Band Physical Downlink Control Channel (NPDCCH) transmission immediately after a predetermined User Equipment (UE) processing delay, wherein a UE is configured to disable a HARQ-Acknowledgement (HARQ-ACK) feedback transmission;
the base station being configured to send a New Data Indicator (NDI) bit configured to signal the UE to selectively enable or disable the HARQ-ACK feedback transmission; and
the base station being configured to perform a downlink (DL) budgeting operation based on the HARQ-ACK feedback transmission from the UE.

10. The apparatus of claim 9, comprising:
the base station being configured reduce the predetermined UE processing delay to a reduced delay $k_1$.

11. The apparatus of claim 10, wherein the predetermined UE processing delay i configured to be 12 milliseconds, and the reduced delay $k_1$ is configured to be less than 12 milliseconds.

12. A User Equipment (UE) configured to be implemented in a Narrowband Information of Things, comprising:
the UE being configured to:
disable a Hybrid Automatic Repeat Request Acknowledgement (HARQ-ACK) feedback transmission in response to a base station configured to disable a HARQ operation and send a Narrow-Band Physical Downlink Control Channel (NPDCCH) transmission immediately after a predetermined UE processing delay; and
flush a decoding buffer after the reception of each Narrow-Band Physical Downlink Shared Channel (NPDSCH) from the base station.

13. The apparatus of claim 12, further comprising:
the UE being configured to omit the HARQ-ACK feedback transmission in a Narrow-Band Physical Uplink Shared Channel (NPUSCH) format.

14. The apparatus of claim 12, the UE being configured to:
receive a New Data Indicator (NDI) bit configured to enable or disable the HARQ-ACK feedback transmission from the base station; and
selectively enable or disable the HARQ-ACK feedback transmission based on the NDI bit.

15. The apparatus of claim 14, wherein the UE is configured to ignore a value communicated by the NDI bit and treat all transmissions from the base station as a new transmission.

16. The apparatus of claim 14, further comprising:

the UE being configured to enable and transmit the HARQ-ACK when the NDI equals 1; and the UE being configured to disable and not transmit the HARQ-ACK when the NDI equals 0.

\* \* \* \* \*